(12) United States Patent
Brülle-Drews (10) Patent No.: US 7,472,020 B2
(45) Date of Patent: Dec. 30, 2008

(54) NAVIGATION SYSTEM WITH VOICE CONTROLLED PRESENTATION OF SECONDARY INFORMATION

(75) Inventor: Christian Brülle-Drews, Hamburg (DE)

(73) Assignee: Harman Becker Automotive Systems GmbH, Karlsbad (DE)

( * ) Notice: Subject to any disclaimer, the term of this patent is extended or adjusted under 35 U.S.C. 154(b) by 518 days.

(21) Appl. No.: 11/197,742

(22) Filed: Aug. 4, 2005

(65) Prior Publication Data

US 2006/0041379 A1 Feb. 23, 2006

(30) Foreign Application Priority Data

Aug. 4, 2004 (DE) .................... 10 2004 037 858

(51) Int. Cl.
*G01C 21/30* (2006.01)
(52) U.S. Cl. ..................... 701/211; 701/210
(58) Field of Classification Search ......... 701/200–202, 701/208–211; 340/988, 995.1
See application file for complete search history.

(56) References Cited

U.S. PATENT DOCUMENTS 6,401,029 B1 * 6/2002 Kubota et al. ............... 701/201

FOREIGN PATENT DOCUMENTS

| EP | 0720003 | 7/1996 |
| EP | 0875729 | 11/1998 |

* cited by examiner

*Primary Examiner*—Yonel Beaulieu
(74) *Attorney, Agent, or Firm*—Brinks Hofer Gilson & Lione (57) ABSTRACT

A navigation system for a vehicle is disclosed, where the navigation system operates in a route planning mode and a route guidance mode. The navigation system employs an interface device that provides route guidance information to a user during the route guidance mode. The route guidance information provided through the interface device may be audible and/or visual, as through a voice and/or visual indicia on a display screen. The navigation system also comprises a voice control system that responds to vocal commands issued by the user. In response to user vocal commands, the navigation system uses the interface device to provide the user with secondary information relating to a planned route. This secondary information may include, for example, locations and items that are ancillary to principal route guidance functions, such as special locations, map topography, environmental information, and the like.

41 Claims, 7 Drawing Sheets

Figure 8

NAVIGATION SYSTEM WITH VOICE CONTROLLED PRESENTATION OF SECONDARY INFORMATION

PRIORITY CLAIM

This application claims the benefit of priority from German Application No. 10 2004 037 858.4, filed Aug. 4, 2004, which is incorporated herein by reference.

BACKGROUND OF THE INVENTION

1. Technical Field

The present invention relates to a navigation system for a vehicle that provides route planning and route guidance information.

2. Related Art

Navigation systems have become standard equipment on many vehicles. The navigation systems often include GPS systems that receive satellite radio signals that are used in triangulating the position of the vehicle. The GPS data also may be combined with other data provided by the vehicle to increase the accuracy with which the current position of the vehicle is determined. This other data may be provided by motion sensors, wheel sensors, and the like. The navigation system may display the current position of the vehicle on a map provided on a display screen within the field of view of the user.

Navigation systems allow for route planning and route guidance from the current position of the vehicle to a desired endpoint destination. To this end, navigation systems may be operated in a route planning mode and a route guidance mode. In the route planning mode, the user enters the desired endpoint destination. The endpoint destination is typically selected through user manipulation of a keyboard, a joystick-like device, a mouse-like device, etc.

Once a particular destination has been selected, the navigation system enters the route guidance mode. In this mode, a database is used to generate a route list. The route list, in turn, is used in combination with the current location of the vehicle to generate route guidance instructions. The route guidance instructions may be provided to the user on the display screen and/or acoustically using a human voice (recorded and/or synthesized). If the vehicle deviates from the predetermined route, the navigation system recalculates the route and provides new driving instructions.

The size of the display screen may limit the amount of information that can be provided to the user by the navigation system at any given time. In many instances, only primary information, such as the street network, route path through the street network, and maneuver points on the street network is provided on the display screen. The user may change only the section of the map that is displayed on the screen or the scale of the map during the route guidance mode. Other changes are inhibited because of the safety issues involved with manipulating the keyboard and/or mouse-like device used to make such changes. Consequently, the user cannot change various navigation system parameters or display other information once route guidance has begun.

SUMMARY

A navigation system for a vehicle is disclosed, where the navigation system operates in a route planning mode and a route guidance mode. The navigation system employs an interface device that provides route guidance information to a user during the route guidance mode. The route guidance information provided through the interface device may be audible and/or visual, as through a voice and/or visual indicia on a display screen. The navigation system also comprises a voice control system that responds to vocal commands issued by the user. In response to user vocal commands, the navigation system uses the interface device to provide the user with secondary information relating to a planned route. This secondary information may include, for example, locations and items that are ancillary to principal route guidance functions, such as special locations, map topography, environmental information, and the like.

Special locations may be grouped into predetermined special location classes. The special location classes may comprise police stations, hospitals, fire stations, gas stations, service stations, parking garages, hotels, train stations, airports, ports, schools, and cultural institutions. When a user selects a special decimation class, the members of the class that are within the area encompassed by the displayed map may be added to the display screen. The added members may be shown on the screen as indexed symbols, where the symbols correspond to the special location class and the indices corresponds to specific members of the special location class. The user may issue vocal commands to select one of the indexed items for further processing by the navigation system. This further processing may comprise modifying the existing navigation route guidance information provided to the user. Alternatively, or in addition, the user may be provided with general information relating to the selected special location, This general information may comprise information such as the hours of operation of the selected special location, the telephone number of the special location, pricing associated with the special location, and the like.

Other systems, methods, features and advantages of the invention will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION OF THE PREFERRED EMBODIMENTS

Figure 1:
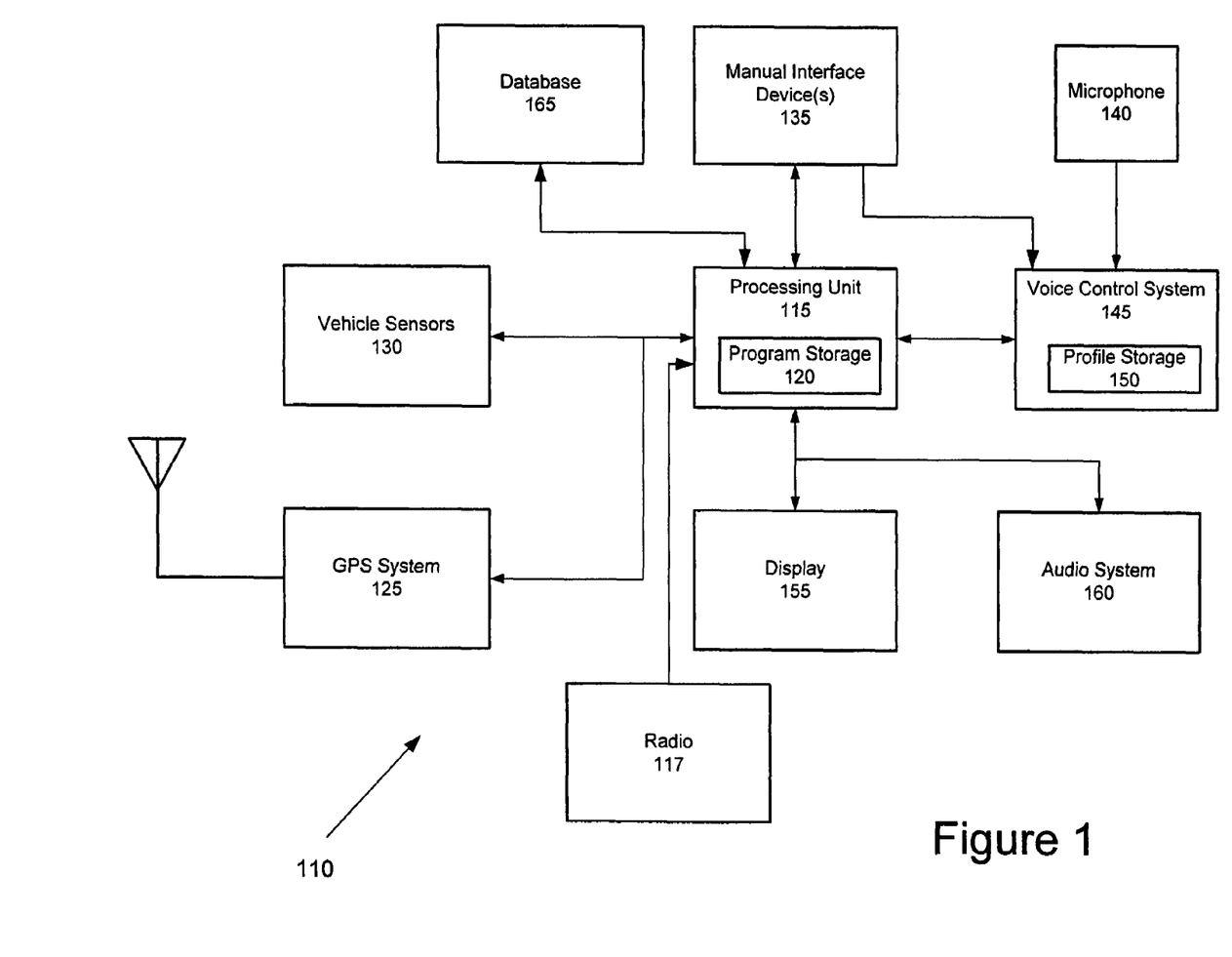
FIG. 1 is a block diagram of one embodiment of a navigation system in which voice commands may be used to initiate provision of secondary information to a user.

A vehicle navigation system 110 in which voice commands may be used to initiate provision of secondary information to a user is shown in FIG. 1. As shown, the navigation system comprises a processing unit 115 that may execute various navigation programs stored in program storage 120. The processing unit 115 may be connected to a GPS system 125 to receive data indicative of the position of the vehicle. Data also may be acquired from vehicle sensors 130 by the processing unit 115 to supplement the positional information provided by the GPS system 125.

A user may issue commands to the navigation system 110 in a number of different manners. In the system of FIG. 1, user commands may be issued through one or more manual interface devices 135 that are connected to the processing unit 115. The manual interface devices 135 may include a keyboard, a mouse-like device, a joystick-like device, etc. User commands also may be issued vocally using microphone 140. As shown, microphone 140 is connected to a voice control system 145 that interfaces with processing unit 115. Voice control system 145 may include profile storage 150 for storing the vocal profiles of one or more users. By limiting the response of the vocal control system 45 to users having a vocal profile stored in profile storage 150, unauthorized use of the navigation system 110 may be inhibited.

Information also may be provided by the navigation system 110 to a user in a number of different manners. In the system of FIG. 1, information may be visually provided to the user on a display 155 and/or provided audibly through audio system 160, both of which may be placed under the control of processing unit 115. Visual information may be presented on display 155 in list form and/or map form. Audible information may be provided to the user as a human voice (pre-recorded and/or synthesized).

The data required by the system 110 to generate navigation information may be stored in a database 165. Database 165 may comprise hard disc drive storage, removable storage (e.g., CD, DVD, magnetic storage media, optical storage media, and the like), flash memory storage, etc. The data stored in database 165 may include information relating to street networks, topographical information, location classes, etc.

Figure 2:
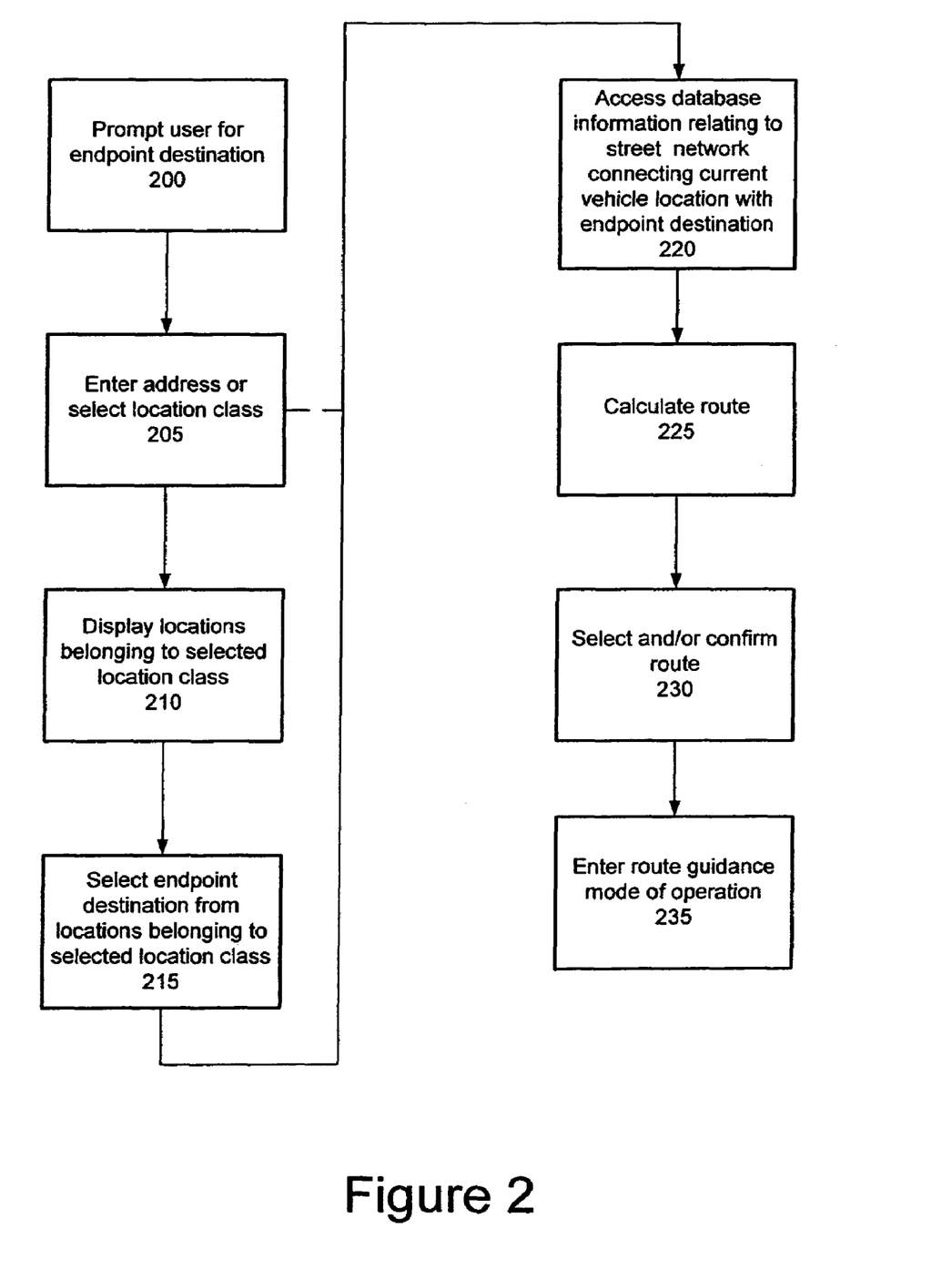
FIG. 2 is a flow chart illustrating one manner in which a route planning mode may be implemented in the system shown in FIG. 1.

Navigation system 110 may be operated in a route planning mode and a route guidance mode. Operation of the system 110 in the route planning mode is shown in FIG. 2. At step 200, the user may be prompted through display 155 to enter or select an endpoint destination. The endpoint destination may be entered in the form of an alphanumeric address at step 205 through one or more of the manual interface devices 135. If an alphanumeric address location is entered at step 205, operation of the navigation system 110 proceeds to step 220. Alternatively, the user may direct the navigation system 110 to display all locations belonging to a particular location class at step 205. At step 210, locations belonging to the requested location class may be provided to the user on display 155 in the form of a list or map. One or more of the manual interface devices 135 may be used at step 215 to select which of the locations of the location class is to be used as the endpoint destination.

Once an endpoint location has been entered, the processing unit 115 accesses information in database 165 relating to the street network connecting the endpoint destination with the current location of the vehicle. This operation takes place at step 220. At step 225, the processing unit 115 calculates one or more routes along the street network between the two locations. The route may be optimized in terms of time, mileage, etc. Multiple routes may be calculated and presented to the user. After the routes have been calculated, they may be provided to the user for selection and/or confirmation at step 230. Route selection may proceed using one or more of the manual interface devices 135 and/or through one or more vocal commands issued through voice control system 145. Once the user selects and confirms a route, the navigation system enters the route guidance mode at step 235.

In the route guidance mode, the navigation system provides instructions that direct the user along the calculated route to the endpoint destination from the current location of the vehicle. The instructions may be provided to the user through the display 155 and/or audio system 160. Display 155 may provide the instructions as a list of streets and turns defining the calculated route. Alternatively, a map showing the calculated route on a street network may be provided on display 155 to the user. Audio system 160 may provide the instructions in the form of a human voice that identifies upcoming turns, exits, etc.

Figure 3:
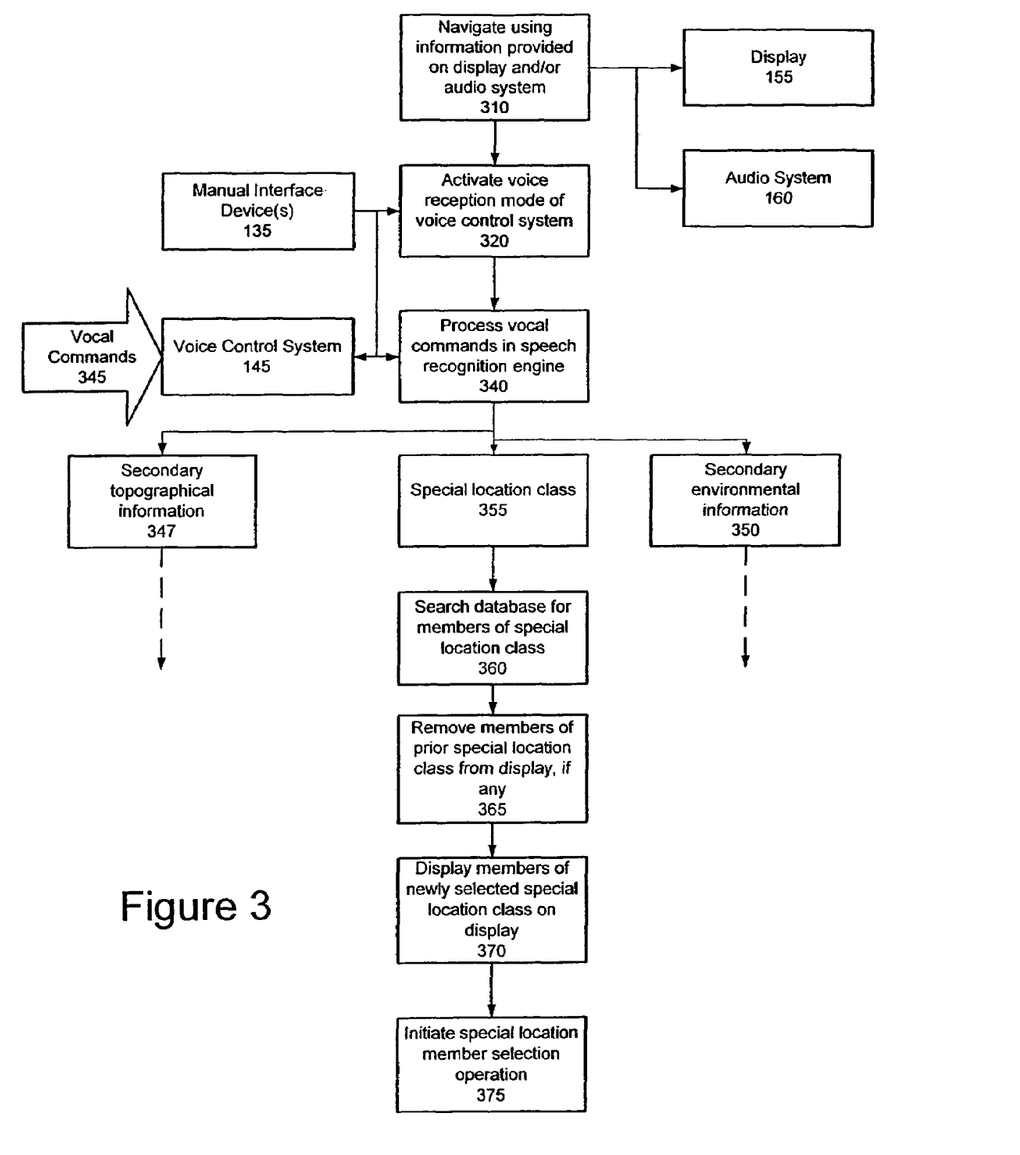
FIG. 3 is a flow chart illustrating one manner in which a route guidance mode may be implemented in the system shown in FIG. 1.

FIG. 3 illustrates one manner in which the navigation system 110 may operate while in the route guidance mode. In accordance with FIG. 3, the driver/user may navigate the vehicle at step 310 during the route guidance mode with the help of a map provided on display 155 that shows a calculated route to the endpoint destination. Alternatively or additionally, the navigation system 110 provides acoustical route guidance instructions through audio system 160 using, for example, a human voice that is pre-recorded and/or synthesized.

The navigation system 110 also employs the voice control system 145 in the route guidance mode. The voice control system 145 allows the user to issue vocal commands to control various aspects of the navigation system 110. The voice control system 145 may operate in a voice reception mode as well as a voice rejection mode. In the voice reception mode, the voice control system 145 stands ready to receive a wide range of speech commands from the user. In the voice rejection mode, however, the voice control system 145 does not respond to any voice commands. Alternatively, the voice rejection mode may be implemented as a standby mode of operation in which the voice control system 145 responds only to a limited set of voice commands issued by the user. The use of multiple operational modes by the voice command system 30 is optional.

During the route guidance mode, a user may wish to selectively view secondary information on the display screen 155. This secondary information may include, for example, locations and items that are ancillary to the principal route guidance functions, such as special locations, map topography, environmental information, and the like. For example, the user may wish to find parking garages in the neighborhood of a primary endpoint destination, such as the garages near a theater. It also may be useful to locate gas stations or service stations proximate the route to the primary endpoint destination. Further, topographical information showing altitudes and gradients may be useful to users navigating in mountain areas during the winter.

Secondary information also may be used in connection with route changes that are implemented by the navigation system in response to changing traffic conditions. For example, current traffic information may be received by a radio 117 (see FIG. 1) in digitized form and provided to the processing unit 115. The processing unit 115 may calculate alternative routes during travel in response to this traffic information and provide these alternative routes as options to the user. If the user decides to follow one of the alternative routes, it may be advantageous to display special locations that are different from the special locations, if any, that may have been originally selected during the route planning mode.

When a multiple mode voice control system is employed, the voice control system 145 is first activated at step 320 to place it in the voice reception mode of operation. The voice control system 145 may be placed in this mode in a variety of different manners. For example, a manual switch or the like included among the manual interface devices 135 may be actuated by the user to activate the voice control system 145. Alternatively, one of the limited commands that the voice control system 145 responds to while in the voice rejection mode may include a wake-up command that causes the voice control system 145 to enter the voice reception mode of operation.

At step 340, a speech recognition engine implemented in the navigation system 110 accepts one or more vocal commands 345 issued by the user. The vocal commands 345 identify the type of secondary information that is requested by the user. Some of the optional secondary information that may be selected by the user through vocal commands 345 includes, for example, secondary topographical information 347, secondary environmental information 350, and special location classes 355. The system also may determine at step 340 whether the vocal command issued by the user is valid.

In FIG. 3, the voice command processing that is executed at step 340 indicates that the user has issued vocal commands directing the system to display one or more special location classes 355. The members of the special location class may be shown at their respective geographic locations on the map on the display screen 155 or provided on the display screen 155 as a list. The special location classes may include location classes, such as gas stations, service stations, train stations, airports, ports, hotels, parking garages, schools, and cultural institutions. Special location classes also may include classes of emergency locations, such as police stations and hospitals, as well as entertainment locations, such as historical landmarks, recreational facilities and parks.

At step 360, the processing unit 115 executes a database search for special locations belonging to the selected special location class. Optionally, all secondary information other than that identified for display by the user may be removed from the display screen 155 at step 365. Special locations within the geographic area proximate the calculated route that belong to the newly identified special location class are provided to the user at step 370.

The navigation system 110 also may allow the user to select a member of the special location class provided at step 370 for further processing. One manner in which this may be accomplished is by initiating a special location member selection operation at step 375. An exemplary implementation of this selection operation as well as an example of how a map on the display screen may respond during the selection operation is shown in FIGS. 4, 5 and 6.

Figure 4:
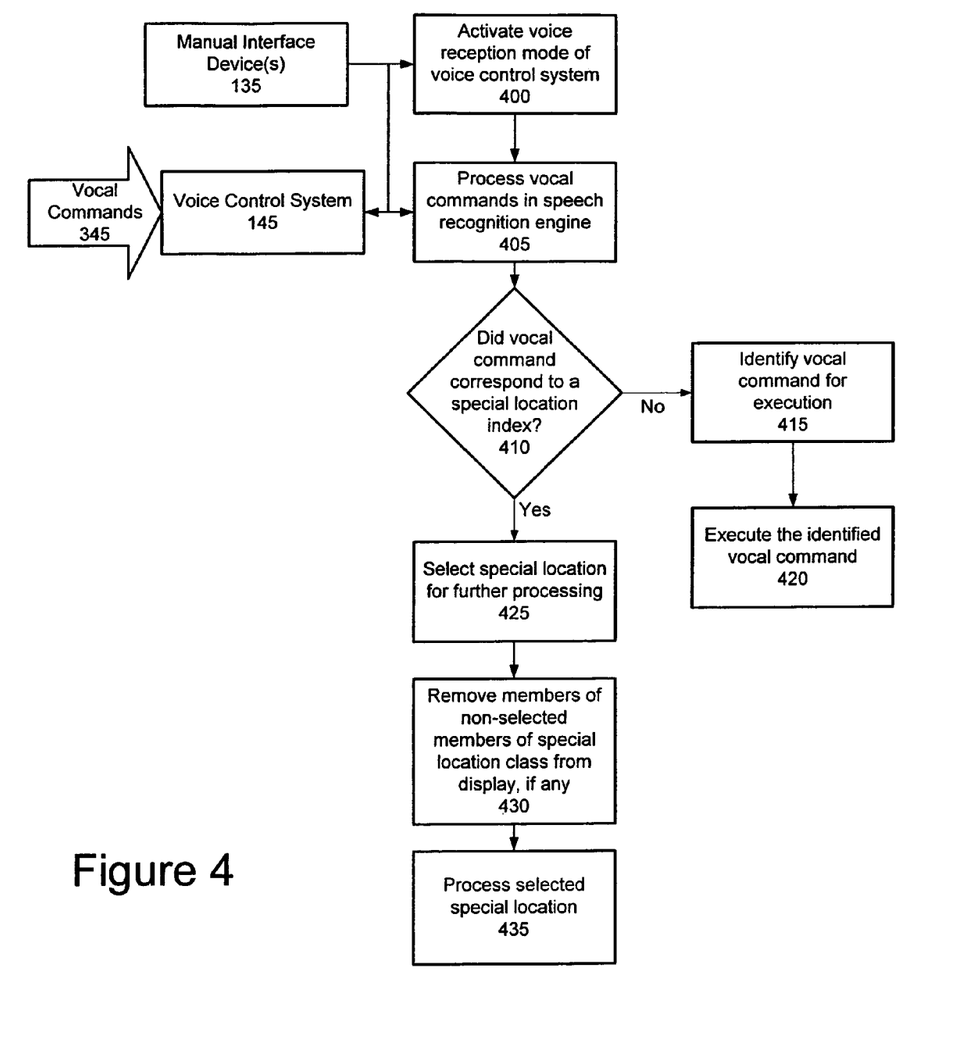
FIG. 4 is a flow chart illustrating one manner in which a particular member of a special location class may be selected by the user for further processing.
Figure 5:
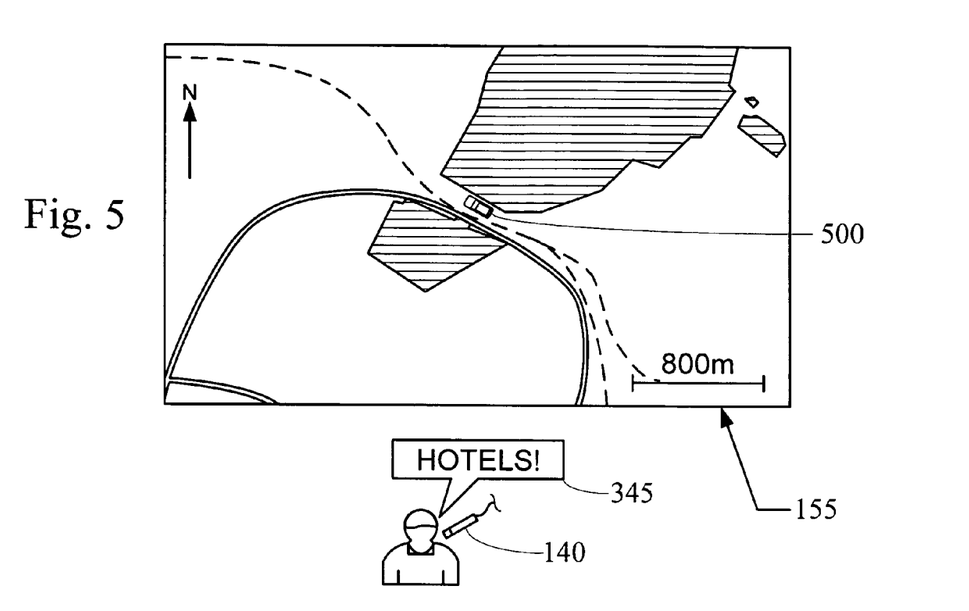
FIGS. 5 and 6 illustrate one manner in which the display of the system shown in FIG. 1 may respond to the operations shown in FIG. 3.
Figure 6:
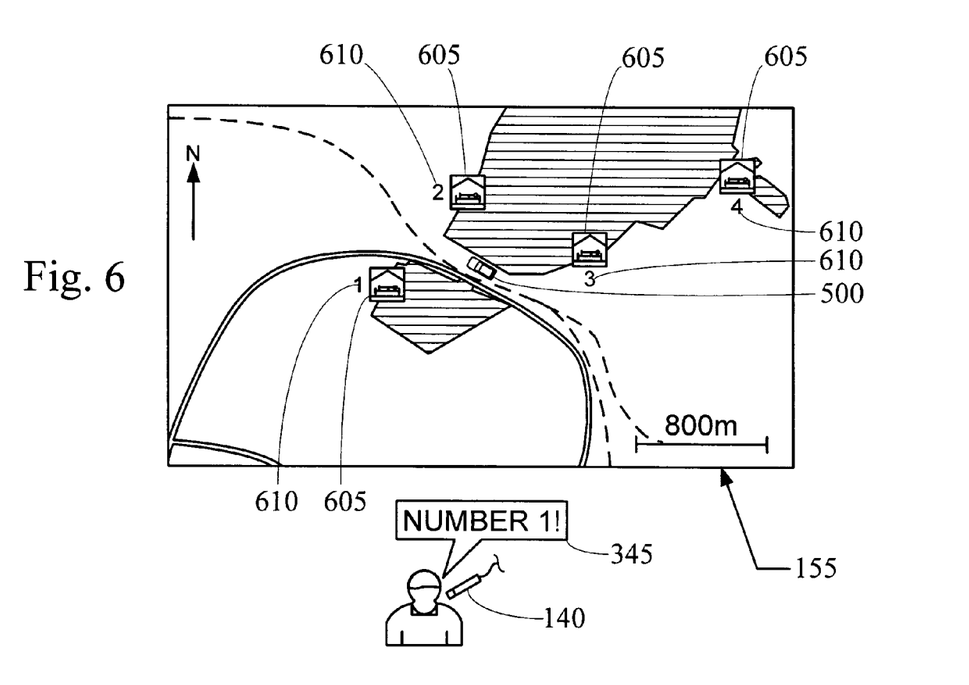

In the example shown in FIGS. 4 through 6, the user has selected a city center 500 (dark area) as an endpoint destination during the route planning mode of operation. The navigation system 110 then enters the route guidance mode to provide the user with driving instructions to reach the city center from the current location of the vehicle. The map is provided to the user on the display screen 155 and is active during the route guidance mode. To reduce screen clutter, secondary information initially may be omitted from the display screen 155 by the navigation system 110.

Selection of secondary information through vocal commands issued by the user may proceed in the manner shown in FIG. 3. In this example, the user wants to display the locations of hotels proximate the planned route to the city center. Accordingly, the user may issue a vocal command 345, such as saying the word "hotels," to direct the navigation system 110 to show special locations belonging to the special location class "hotel" on the display screen 155. This operation is shown in FIG. 5 and corresponds to selection of a special location class at step 355 in FIG. 3. In response to this command, the navigation system 110 may graphically display all of the hotels stored in database 165 that are proximate the calculated route to the endpoint destination.

As shown in FIG. 5, the members of the special location class "hotel" are graphically presented to the user using icon symbols 605 that are placed at the corresponding geographic locations of the map. The icon symbol representing the special location class "hotel" may be in the form of a large building, although other symbols also may be used. All of the icons for a given special location class may be the same, while icons for different special location classes may be different. Once the user has issued a command to display a particular special location class, the voice control system 145 may be automatically deactivated and placed in the voice rejection mode to prevent further triggering of the voice control system 145 by spurious noise and/or ordinary conversation.

FIG. 5 also shows that each member 605 of the special location class may be provided on the display screen 155 with a corresponding index 610, such as a number, name, alphabetic character or the like. These indices may be included in corresponding vocal commands 145 to select a particular member of the displayed special location class for further processing. The foregoing display operations may be executed at step 370 of FIG. 3.

If the voice control system is in the voice rejection mode after a special location class has been selected and displayed, the user again operates the appropriate switch or issues the necessary vocal command to place the voice control system 145 in the voice reception mode of operation as shown at step 400 of FIG. 4. While in this mode, the user may select a specific hotel as an individual special location using a vocal command that includes an identification of the index 610 corresponding to the specific hotel. At step 405, the vocal command received through voice control system 145 is recognized by the speech recognition engine. A check is then made at 410 to determine whether the recognized local command corresponds to the index of a member of the special location class shown on the map of display screen 155. If the recognized vocal command does not correspond to an index, the navigation system 110 proceeds at step 415 to determine which, if any, vocal command has been issued by the user. Execution of a vocal command other than one identifying an index proceeds at step 420.

Selection of a member of a displayed special location class may be carried out, for example, by uttering a command that includes the index, such as "Number 1", "Select 1 ", "Choose 1", or the like. If an index selection command is recognized at step 410, the navigation system 110 selects the hotel corresponding to the index number for further processing at step 425. In the example, the user has selected the hotel corresponding to index number "1." Members of the special location class that were not selected by the user may be removed from the display at step 430. Further processing of the selected special location may proceed at step 220.

The navigation system may process information associated with a selected special location at step 435 in a variety of different manners. For example, the navigation system 110 may replace and/or modify the existing route information based on the selected special location and provide guidance information for the corresponding route to the user on the display 155 and/or through audio system 160.

Figure 7:
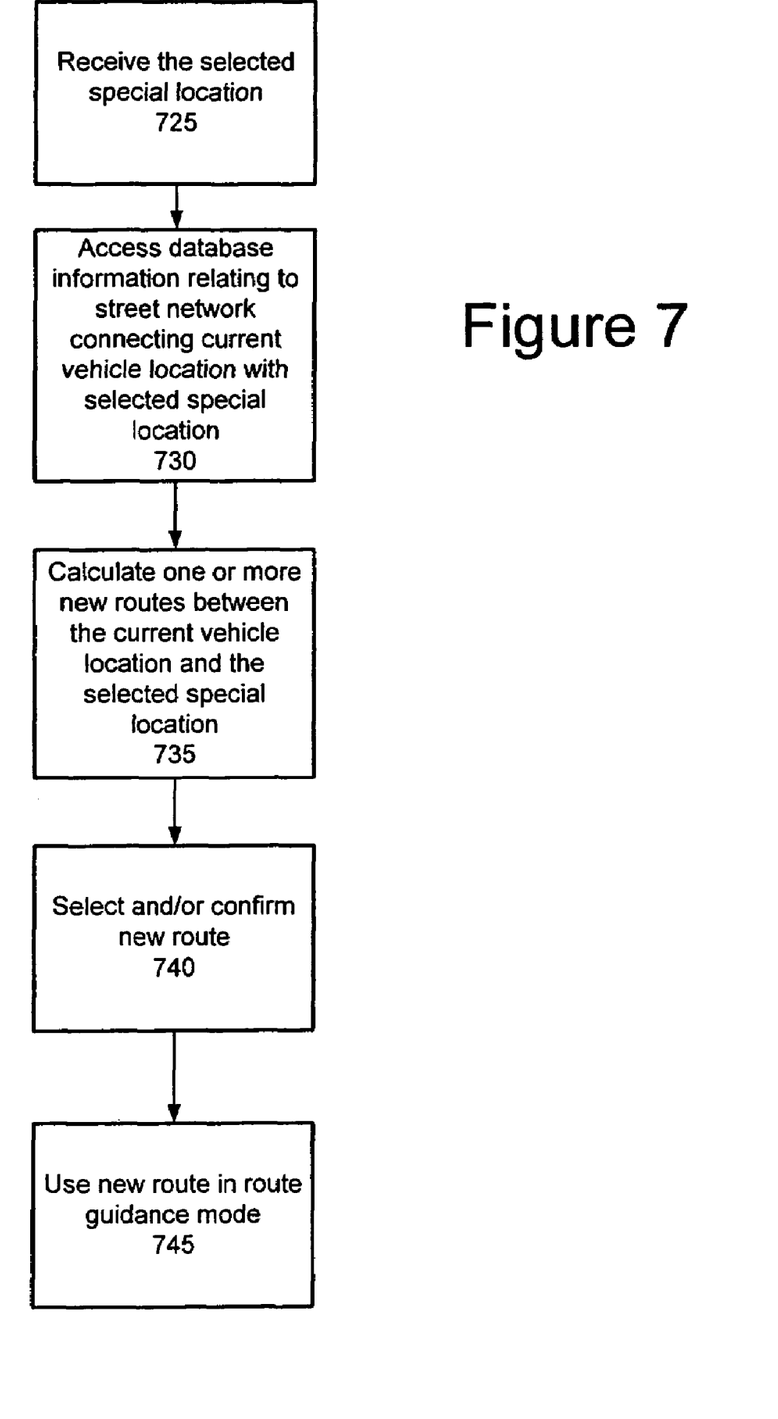
FIG. 7 illustrates one manner in which a member of the special location class may be processed after it has been selected by the user.

One way in which the selected special location may be used to replace the existing route information is shown in FIG. 7. In this example, the special location is used as a new endpoint destination. At step 725, the process receives information identifying the particular special location that has been selected during the operations shown in FIG. 4. The processing unit 115 accesses database 165 at step 730 to obtain specific information relating to the street network connecting the current vehicle location with the selected special location. Using this database information, the processing unit 115 calculates one or more routes between the current vehicle location and the selected special location at step 735. Again, the routes may be optimized in terms of time, mileage, etc. Multiple routes may be calculated at step 735. These routes then may be presented to the user. User selection and/or confirmation of a specific calculated route takes place at step 740. This selection and/or confirmation may take place through one or more of the manual interface devices 135 and/or one or more vocal commands issued through the voice control system 145. Once the new route has been confirmed, it is used in the route guidance mode at step 745.

Figure 8:
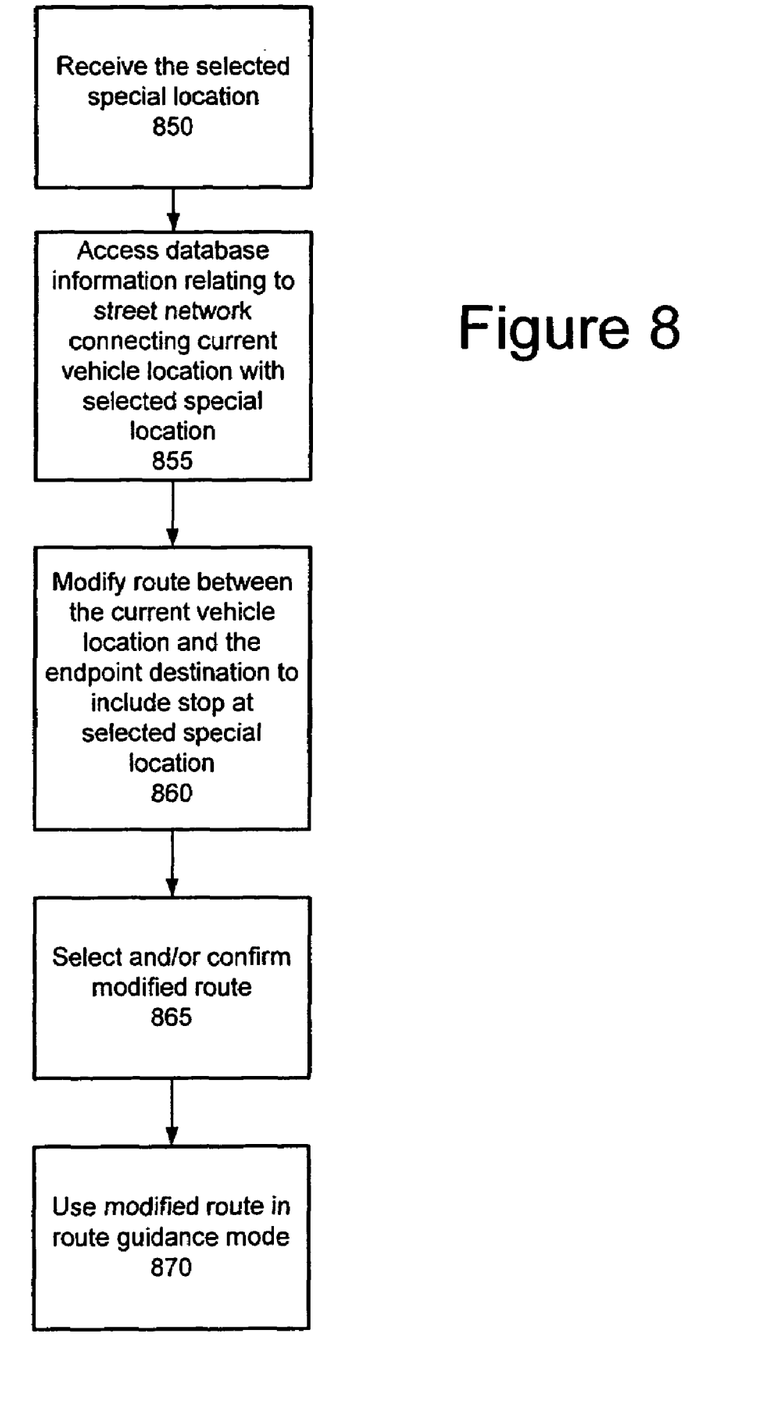
FIG. 8 illustrates another manner in which a member of the special location class may be processed after it has been selected by the user.

One way in which the selected special location may be used to modify the existing route information is shown in FIG. 8. In this example, the special location is used as a transit destination and the existing route guidance information is modified to include an intermediate stop at the special location. The endpoint destination remains unchanged. At step 850, the process receives information identifying the particular special location that has been selected during the operations shown in FIG. 4. The processing unit 115 accesses database 165 at step 855 to obtain specific information relating to the street network connecting the current vehicle location with the selected special location. Using this database information, the processing unit 115 recalculates and modifies the existing route to include an intermediate stop at the selected special location. This operation is executed at step 860. Again, multiple routes may be calculated and the routes may be optimized in terms of time, mileage, etc. One or more of these routes then may be presented to the user. User selection and/or confirmation of a modified route takes place at step at 65. This selection and/or confirmation may take place through one or more of the manual interface devices 135 and/or one or more vocal commands issued through the voice control system 145. Once the modified route has been confirmed, it is used in the route guidance mode at step 870.

Further processing of the selected special location may also include the provision of general information relating to the special location to the user in an audible format or visual format. This general information may comprise information such as the hours of operation of the selected special location, the telephone number of the special location, and pricing associated with the special location.

Other vocal commands may be issued to the navigation system during the route guidance mode of operation. For example, the user may initiate displaying and blanking of certain secondary information, without a corresponding change of the primary route information shown on display screen 155.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

I claim:

1. A navigation system for a vehicle comprising:
an interface device for allowing a user to enter endpoint destination information during a route planning mode of operation, where the interface device further provides route guidance information to a user while in a route guidance mode of operation in which the navigation system provides instructions that direct the user along a calculated route to the endpoint destination from a current location of the vehicle; and
a voice control system that responds to vocal commands issued by the user during the route guidance mode to direct the navigation system to provide the user with one or more classes of secondary information through the interface device, where the voice control system further responds to vocal commands issued by the user during the route guidance mode to select secondary information in a selected class of secondary information for provision through the interface device.

2. The navigation system of claim 1 where the interface device comprises a display screen.

3. The navigation system of claim 2 where the interface device further comprises a map that is displayed on the display screen.

4. The navigation system of claim 3 where the secondary information is provided to the user as one or more icons on the map.

5. The navigation system of claim 1 where the secondary information comprises special location classes.

6. The navigation system of claim 5 where the special location classes comprise classes selected from the group consisting of police stations, hospitals, fire stations, gas stations, service stations, parking garages, hotels, train stations, airports, ports, schools, and cultural institutions.

7. The navigation system of claim 5 where the voice control system is responsive to one or more vocal commands to select a special location from one or more special locations provided to the user.

8. The navigation system of claim 5 where special locations of at least one special location class are indexed when provided to the user on the interface device.

9. The navigation system of claim 1 where the interface device comprises a display screen on which a map is displayed, where the secondary information comprises one or more special location classes, and where the provision of special locations of a special location class comprises display of symbolic representations corresponding to the special locations on the map.

10. The navigation system of claim 9 where special locations of at least one special location class are indexed when provided to the user on the interface device.

11. The navigation system of claim 10 where the voice control system is responsive to one or more vocal commands to select a special location from one or more special locations provided to the user using the index for the special location.

12. The navigation system of claim 11 where the navigation system modifies route guidance information provided to the user in response to selection of the special location.

13. The navigation system of claim 12 where the navigation system uses the special location as an endpoint destination.

14. The navigation system of claim 12 where the navigation system uses the special location as a transit destination.

15. The navigation system of claim 1 where the voice control system operates in a voice reception mode and a voice rejection mode.

16. The navigation system of claim 15 and further comprising a manual switch to control whether the voice control system is in the voice reception mode or the voice rejection mode.

17. The navigation system of claim 15 where the voice control system is responsive to one or more vocal commands to switch between the voice reception mode and the voice rejection mode.

18. The navigation system of claim 17 where the voice rejection mode is a standby mode of operation.

19. The navigation system of claim 7 where the voice control system automatically enters a voice rejection mode after user selection of the special location in which the voice control system is only responsive to a subset of a set of voice control commands.

20. The navigation system of claim 1 and further comprising a storage unit for storing at least one user vocal profile.

21. A navigation system for a vehicle, where the navigation system operates in a route planning mode in which a user enters an endpoint destination and a route guidance mode in which the navigation system provides instructions that direct the user along a calculated route to the endpoint destination from the current location of the vehicle, the navigation system comprising:
- a map display providing route guidance information to the user during the route guidance mode; and
- a voice control system that responds to vocal commands issued by the user during the route guidance mode to direct the navigation system to display symbols on the map display, where the symbols correspond to one or more secondary information classes audibly selected using the vocal commands, and where the voice control system is further responsive to vocal commands issued by the user to direct the navigation system to display secondary information corresponding to a selected display symbol.

22. The navigation system of claim 21 where the secondary information comprises special location classes.

23. The navigation system of claim 22 where the special location classes comprise classes selected from the group consisting of police stations, hospitals, fire stations, gas stations, service stations, parking garages, hotels, train stations, airports, ports, schools, and cultural institutions.

24. The navigation system of claim 22 where special locations of the special location classes are indexed on the map display.

25. The navigation system of claim 24 where the voice control system is responsive to one or more vocal commands that include the index to select a special location.

26. The navigation system of claim 21, where the navigation system modifies route guidance information provided on the map display in response to selection of the special location.

27. The navigation system of claim 26 where the navigation system uses the special location as a new endpoint destination.

28. The navigation system of claim 26 where the navigation system uses the special location as a transit destination.

29. The navigation system of claim 21 where the voice control system operates in a voice reception mode and a voice rejection mode.

30. The navigation system of claim 29 and further comprising a manual switch to control whether the voice control system is in the voice reception mode or the voice rejection mode.

31. The navigation system of claim 29 where the voice control system is responsive to one or more vocal commands to switch between the voice reception mode and the voice rejection mode.

32. A navigation system for a vehicle, where the navigation system operates in a route planning mode in which a user enters an endpoint destination and a route guidance mode in which the navigation system provides instructions that direct the user along a calculated route to the endpoint destination a current location of the vehicle, the navigation system comprising:
- a map display providing route guidance information to a user during the route guidance mode;
- a voice control system that responds to vocal commands issued by the user during the route guidance mode to display indexed symbols on the map display, where the indexed symbols correspond to one or more special locations in one or more special location classes, where the special location classes correspond to special location classes audibly selected using the vocal commands, and where the voice control system is responsive to one or more further vocal commands that include the index to select a special location for further processing by the navigation system, and where indices for non-selected special locations are removed from the map display after selection of the special location.

33. The navigation system of claim 32 where the further processing comprises modifying navigation route guidance information provided on the map display in response to selection of the special location.

34. The navigation system of claim 33 where the navigation system uses the special location as a new endpoint destination.

35. The navigation system of claim 33 where the navigation system uses the special location as a transit destination.

36. The navigation system of claim 32 where the special location classes comprise classes selected from the group consisting of police stations, hospitals, fire stations, gas stations, service stations, parking garages, hotels, train stations, airports, ports, schools, and cultural institutions.

37. A navigation system for a vehicle, where the navigation system operates in a route planning mode in which a user enters an endpoint destination and a route guidance mode in which the navigation system provides instructions that direct the user along a calculated route to the endpoint destination from a location of the vehicle, the navigation system comprising:
- a map display providing route guidance information to a user during the route guidance mode;
- a voice control system that responds to vocal commands issued by the user during the route guidance mode to direct display one or more special locations in one or more special location classes, where the special location classes correspond to special location classes audibly selected using the vocal commands, and where the voice control system is responsive to one or more further vocal commands to direct selection of a specific special location for further processing by the navigation system, and where the voice control system may selectively enter a voice rejection mode after selection of the specific special location.

38. The navigation system of claim 37 where the further processing comprises modifying navigation route guidance information provided on the map display in response to selection of the special location.

39. The navigation system of claim 38 where the navigation system uses the special location as a new endpoint destination.

40. The navigation system of claim 38 where the navigation system uses the special location as a transit destination.

41. The navigation system of claim 37 where the special location classes comprise classes selected from the group consisting of police stations, hospitals, fire stations, gas stations, service stations, parking garages, hotels, train stations, airports, ports, schools, and cultural institutions.

* * * * *